United States Patent
Ro et al.

(10) Patent No.: US 9,893,857 B2
(45) Date of Patent: Feb. 13, 2018

(54) METHOD AND APPARATUS FOR TRANSMITTING AND RECEIVING REFERENCE SIGNAL IN DEVICE-TO-DEVICE COMMUNICATION

(71) Applicant: Samsung Electronics Co., Ltd., Suwon-si, Gyeonggi-do (KR)

(72) Inventors: Sang-Min Ro, Seoul (KR); Yong-Jun Kwak, Yongin-si (KR); Kyeong-In Jeong, Yongin-si (KR); Hyoung-Ju Ji, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 14/664,030

(22) Filed: Mar. 20, 2015

(65) Prior Publication Data

US 2015/0270939 A1    Sep. 24, 2015

(30) Foreign Application Priority Data

Mar. 21, 2014 (KR) ........................ 10-2014-0033627
May 20, 2014 (KR) ........................ 10-2014-0060631

(51) Int. Cl.
*H04L 5/00* (2006.01)
*H04L 27/26* (2006.01)
(Continued)

(52) U.S. Cl.
CPC ........ *H04L 5/0051* (2013.01); *H04L 27/2613* (2013.01); *H04L 27/2646* (2013.01);
(Continued)

(58) Field of Classification Search
None
See application file for complete search history.

(56) References Cited

U.S. PATENT DOCUMENTS

2010/0034312 A1* 2/2010 Muharemovic ..... H04L 27/2613
  375/267
2011/0085503 A1* 4/2011 Nam ................... H04W 72/042
  370/329
(Continued)

FOREIGN PATENT DOCUMENTS

EP    2 768 273 A1    8/2014
WO    2013/191367 A1   12/2013

OTHER PUBLICATIONS

Interdigital, Physical channel design for D2D communication, 3GPP TSG-RAN WG1 Meeting #75, R1-135606, Nov. 2, 2013, San Francisco, USA.
(Continued)

*Primary Examiner* — Mohammad Adhami
(74) *Attorney, Agent, or Firm* — Jefferson IP Law, LLP (57) ABSTRACT

A method and an apparatus for generating a sequence including a demodulation reference signal (DM RS) and a preamble in device-to-device (D2D) communications are provided. The method includes obtaining, by a controller of an apparatus, a synchronization identify of a synchronization signal used for the D2D communication, obtaining a group identify of a communication group where a terminal belongs, generating a DM RS sequence for the D2D communication based on at least one of the synchronization identity and the group identity, mapping the DM RS sequence to predetermined symbol positions in a subframe, and transmitting the DM RS sequence from the terminal through the subframe.

32 Claims, 4 Drawing Sheets

(51) Int. Cl.
*H04W 8/00* (2009.01)
*H04W 76/02* (2009.01)

(52) U.S. Cl.
CPC ........... *H04L 5/0058* (2013.01); *H04W 8/005* (2013.01); *H04W 76/023* (2013.01)

(56) References Cited

U.S. PATENT DOCUMENTS

| | | | |
|---|---|---|---|
| 2013/0315152 | A1 | 11/2013 | Ratasuk et al. |
| 2014/0003320 | A1 | 1/2014 | Etemad et al. |
| 2014/0233475 | A1 | 8/2014 | Ro et al. |
| 2014/0256369 | A1 | 9/2014 | Ji et al. |
| 2014/0370904 | A1* | 12/2014 | Smith ................ H04W 8/005 455/450 |
| 2015/0131566 | A1 | 5/2015 | Seo et al. |
| 2016/0007269 | A1* | 1/2016 | Chae .................. H04L 5/0048 370/330 |
| 2016/0234045 | A1* | 8/2016 | Lindoff ............ H04L 25/03866 |
| 2016/0294526 | A1* | 10/2016 | Kim .................... H04J 11/0056 |

OTHER PUBLICATIONS

ZTE, Considerations on Synchronization of D2D Broadcast Communications, 3GPP TSG-RAN WG1 #75, R1-135368, Nov. 2, 2013, San Francisco, USA.

Intel Corporation: "On D2D Communication Design Aspects in Public Safety Scenarios", 3GPP DRAFT; R1-132940—Intel—D2D Comm, 3rd Generation Partnership Project (3GPP), Mobile Competence Centre; 650, Route Des Lucioles; F-06921 Sophia-Antipolis Cedex; France.vol. RAN WG1, No. Barcelona, Spain; 20130819-20130823 Aug. 10, 2013 (Aug. 10, 2013), XP050716179, Retrieved from the Internet: URL:http://www.3gpp.org/ftp/tsg_ran/WG1_RL_1/TSGR1_74/Docs/ [retrieved on Aug. 1, 2013 O].

Ericsson: "On Scrambling of D2D Physical Channels", 3GPP DRAFT; R1-140777 Scrambling of D2D Channels, 3rd Generation Partnership Project (3GPP), Mobile Competence Centre; 650, Route Des Lucioles; F-06921 Sophia-Antipolis Cedex; France, vol. RAN WG1, No. Prague, CZ; 20140210-20140214 Feb. 9, 2014 (Feb. 9, 2014), XP050736278, Retrieved from the Internet: URL:http://www.3gpp.org/ftp/Meetings_3GPP_SYNC/RAN/RAN1/Docs/ [retrieved on Feb. 9, 2014].

Ericsson: "Synchronization Procedures for D2D Discovery and Communication", 3GPP DRAFT; R1-140773 D2D Synchronization Procedures, 3rd Generation Partnership Project (3GPP), Mobile Competence Centre; 650, Route Des Lucioles; F-06921 Sophia-Antipolis Cedex; France, vol. RAN WG1, No. Prague, Czech Republic; 20140210-20140214 Jan. 31, 2014 (Jan. 31, 2014), XP050751730, Retrieved from the Internet: URL:http://www.3gpp.org/ftp/tsg_ran/WG1_RL_1/TSGR1_76/Docs/ [retrieved on Jan. 31, 2014].

* cited by examiner

METHOD AND APPARATUS FOR TRANSMITTING AND RECEIVING REFERENCE SIGNAL IN DEVICE-TO-DEVICE COMMUNICATION

CROSS-REFERENCE TO RELATED APPLICATION(S)

This application claims the benefit under 35 U.S.C. § 119(a) of a Korean patent application filed on Mar. 21, 2014 in the Korean Intellectual Property Office and assigned Serial number 10-2014-0033627, and a Korean patent application filed on May 20, 2014 in the Korean Intellectual Property Office and assigned Serial number 10-2014-0060631, the entire disclosure of each of which is hereby incorporated by reference.

TECHNICAL FIELD

The present disclosure relates to methods and apparatuses for communicating reference signals in device-to-device (D2D) communications.

BACKGROUND

Upon performing data communications, a transmitting device typically scrambles a bit block constituted of data to be transmitted into a scrambling sequence, modulates the same, and transmits, to a receiving device, the modulated signal together with a reference signal for demodulation (demodulation reference signal (DM RS)). In this case, the receiving device estimates a channel through the DM RS of the received signal and uses the estimated channel for demodulating the received signal.

The data bit block obtained after demodulation is descrambled using the same scrambling sequence as that used in the transmitting device. Scrambling and descrambling are provided to randomize the influence of interference signals on the data bit block. For signal demodulation and scrambling using the DM RS, here, the transmitting device and the receiving device should share the information necessary for generating the same DM RS and scrambling sequence. To that end, typical cellular communication systems allow the broadcast signal transmitting a DM RS to provide a user equipment (UE) (that is a terminal or a device) in the cell with parameters necessary for generating the DM RS and/or scrambling sequence, so that the UEs may exactly receive the DM RS from the broadcast signal based on the parameters.

The 3rd Generation Partnership Project (3GPP), an organization for standardizing asynchronous cellular mobile communications, discusses the idea for allowing a long term evolution (LTE) standard, a next-generation mobile communication system, to support wireless communications between UEs or between devices, so-called device-to-device (D2D) communication, as well as wireless communications between a base station (BS) to a UE. The conventional LTE standard is only supportive of the wireless communication between a BS to a UE, and the generation of DM RSs and scrambling have been done in a way appropriate for such communication environment.

In the conventional LTE wireless communication environment, it is the base station and the terminal in the service coverage of the base station which perform data communication, and the base station and the terminal may easily share the information necessary for generating DM RSs and initializing a scrambling sequence. However, D2D communications may encounter situations where the terminals or devices participating in data communication may belong to the service coverage of different base stations, a specific terminal or device cannot be served by a base station or departs from the service coverage, rendering it difficult for devices to share the information necessary for generating DM RSs and initializing a scrambling sequence. Among others, support of one-to-many communications, i.e., broadcast communications, between devices in the 3GPP LTE standard, is a main topic of the ongoing discussion.

Further, the 3GPP discusses backing up the operation for a D2D terminal to discover other neighboring D2D terminals in the LTE standard. For this purpose, each D2D terminal transmits a discovery signal. The discovery signal is used for other D2D terminals to recognize the presence of the D2D terminal Each D2D terminal transmits its own discovery signal within some of time and frequency resources configured for communicating the discovery signal and attempts to detect the discovery signals transmitted from other D2D terminals using the remainder of the time and frequency resources. Thereafter, the D2D terminals determine whether there are D2D terminals corresponding to the time and frequency resources where the detection has been attempted. The discovery signal may include a message containing information relating to the terminal that has transmitted the discovery signal and a DM RS for demodulating the message. The bits constituting the message block may be scrambled before modulated.

The above-described D2D discovery operation should be supported to allow for discovery between D2D terminals in the service coverage of different base stations and D2D discovery between a radio resource control (RRC) connected terminal and an RRC idle terminal.

Existing DM RSs and preamble generation schemes defined in the LTE standard cannot apply to D2D communications. For example, in a case where D2D terminals belong to the service coverage of different base stations, generation of a DM RS sequence requires an inter-base station signaling overhead for sharing the information regarding the base stations which the D2D terminals respectively belong to. Further, unless the D2D terminals can be served by the base stations, they cannot utilize base station-related information and higher signaling from the base stations that are inevitable for generating DM RSs and preambles.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for generating a sequence used in a demodulation reference signal (DM RS) and preamble in order to fit a device-to-device (D2D) communication environment.

Another aspect of the present disclosure is to provide a method and apparatus for generating a reference signal used for communicating communication data, a reference signal used for communicating a discovery signal message, and a sequence used as a preamble in D2D communications.

Another aspect of the present disclosure is to provide a method and apparatus for communicating a reference signal used for D2D communications.

The present disclosure may be applicable to the generation of a sequence including a preamble and/or a DM RS of a terminal performing D2D communications.

In accordance with an aspect of the present disclosure, a method for transmitting a reference signal in a D2D communication is provided. The method includes obtaining, by a controller of an apparatus, a synchronization identity of a synchronization signal used for the D2D communication, obtaining a group identity of a communication group where a terminal belongs, generating a demodulation reference signal (DM RS) sequence for the D2D communication based on at least one of the synchronization identity and the group identity, mapping the DM RS sequence to predetermined symbol positions in a subframe, and transmitting the DM RS sequence from the terminal through the subframe.

In accordance with another aspect of the present disclosure, a method for receiving a reference signal in a D2D communication is provided. The method includes obtaining, by a controller of an apparatus, a synchronization identity of a synchronization signal used for the D2D communication, obtaining a group identity of a communication group where a terminal belongs, generating a demodulation reference signal (DM RS) sequence for the D2D communication based on at least one of the synchronization identity and the group identity, detecting a reference signal transmitted from a terminal at predetermined symbol positions in a subframe, and estimating a channel state of the reference signal using the detected reference signal and the generated DM RS sequence.

In accordance with another aspect of the present disclosure, an apparatus for transmitting a reference signal in a D2D communication is provided. The apparatus includes a controller configured to obtain a synchronization identity of a synchronization signal used for the D2D communication, to obtain a group identity of a communication group where a terminal belongs and to generate a demodulation reference signal (DM RS) sequence for the D2D communication based on at least one of the synchronization identity and the group identity, and a transmitter configured to map the DM RS sequence to predetermined symbol positions in a subframe and to transmit data and the DM RS sequence through the subframe.

In accordance with another aspect of the present disclosure, an apparatus for receiving a reference signal in D2D communication is provided. The apparatus includes a controller configured to obtain a synchronization identity of a synchronization signal used for the D2D communication, to obtain a group identity of a communication group where a terminal belongs, and to generate a demodulation reference signal (DM RS) sequence for the D2D communication based on at least one of the synchronization identity and the group identity, and a receiver configured to detect a reference signal transmitted from a terminal at predetermined symbol positions in a subframe and to estimate a channel state of the reference signal using the generated DM RS sequence and the detected reference signal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments set forth herein may be used in various radio communication systems, such as code division multiple access (CDMA), time division multiple access (TDMA), frequency division multiple access (FDMA), orthogonal frequency division multiple access (OFDMA), and single carrier-FDMA (SC-FDMA) systems.

The terms "system" and "network" may be sometimes interchangeably used herein. CDMA systems may implement radio technologies such as terrestrial radio access (UTRA) or CDMA2000. UTRA includes wideband CDMA (W-CDMA) and other CDMA variations. CDMA2000 includes IS-2000, IS-95, and IS-856 standards. TDMA systems may implement radio technologies such as global system for mobile communications (GSM). OFDMA systems may implement radio technologies such as evolved UTRA (E-UTRA), ultra-mobile broadband (UMB), IEEE 802.11 (Wi-Fi), IEEE 802.16 (Worldwide Interoperability for Microwave Access (WIMAX)), IEEE 802.20, and flash OFDM.

UTRA and E-UTRA are part of universal mobile telecommunications system (UMTS). 3GPP LTE is a post-UMTS release that adopts OFDMA on downlink and SC-FDMA on uplink. Additionally, such wireless communication systems may further include peer-to-peer (e.g., mobile-to-mobile) adhoc network systems adopting unpaired licensed spectrums, 802.xx wireless local area network (LAN), Bluetooth, and any other short-, and/or long-range radio communication techniques.

Embodiments of the present disclosure are described in association with a terminal. The terminal may be denoted a system, subscriber unit, subscriber station, mobile station, mobile, remote station, remote terminal, mobile device, user terminal, terminal, radio communication device, user agent, user device, and/or user equipment (UE). The terminal may be a cellular phone, personal digital assistant (PDA), handheld device with radio access capabilities, computing device or other processing device connected with a wireless modem.

Further, embodiments of the present disclosure are described in association with a base station. The base station may be denoted an access point, node B, evolved node B (e node B, eNB), or with some other terms.

As used herein, the terms "component," "system," and "module" may refer to a computer-related entity, hardware, firmware, a combination of hardware and software, software, and/or executing software. For example, the component may be a process executed in a processor, processor, object, execution file, execution thread, program, and/or computer, but not limited thereto. One or more components may reside in a process and/or execution thread. One component may be localized in a single computer or may be distributed between two or more computers. Such components may be executed by various computer-readable media with various data structures stored therein. The components may perform communications according to a signal with one or more data packets (for example, data from a component interacting with another component in a local system or distributed system and/or data from a component interacting with other systems through a network, such as the Internet, by a signal).

As set forth herein, various aspects or features may be implemented as a method, apparatus, and/or article that uses standard programming and/or engineering techniques. As used herein, the term "article" may include a computer program, carrier, and/or medium that may be accessed by any computer-readable device. For example, the computer-readable medium may include, but is not limited to, a magnetic storage device (e.g., a hard disk, floppy disk, and/or magnetic tape), an optical disk (e.g., a compact disk (CD), and/or a digital versatile disc (DVD)), a smart card, and a flash memory device (e.g., an erasable programmable read only memory (EPROM), a card, a stick, and/or a key drive).

It should be noted that the terminology as used herein is provided only to describe specific embodiments and is not intended to limit the spirit of the present disclosure. Further, the technical terms used herein, unless defined herein otherwise, should be interpreted in the meanings understood by one of ordinary skill in the art to which the present disclosure pertains, but not in overly comprehensive or restrictive ways.

The terms "comprise" or "include" should not be construed to inevitably include the components or operations described herein.

The term "data" as used herein includes general data communicated by a terminal upon device-to-device (D2D) communication and a message of a discovery signal used for performing an inter-D2D terminal discovery operation. As mentioned herein, the term "demodulation reference signal (DM RS)" includes any of a reference signal, sequence, and preamble that may be used for demodulating the data communicated by a terminal upon D2D communication.

Hereinafter, embodiments of the present disclosure are described in detail with reference to the accompanying drawings. Specifically, FIGS. 1 through 8, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Figure 1:
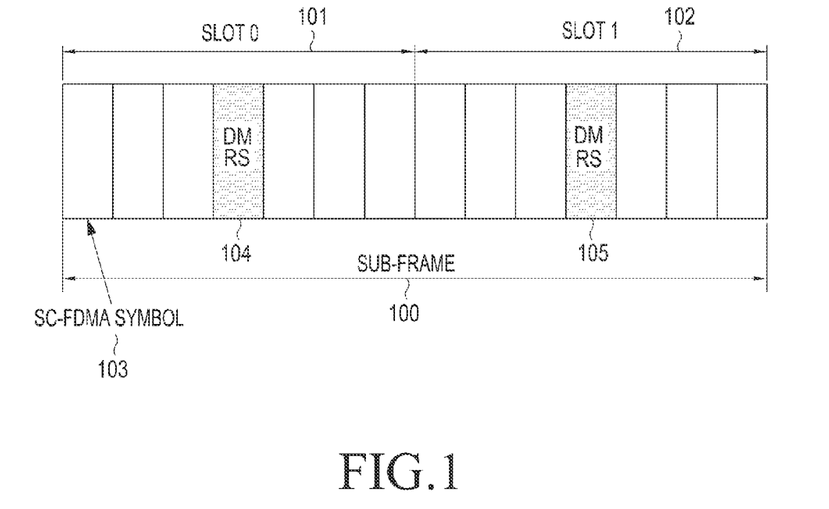
FIG. 1 is a view illustrating an architecture of a physical layer channel according to an embodiment of the present disclosure.

FIG. 1 is a view illustrating an architecture of a physical layer channel according to an embodiment of the present disclosure.

Referring to FIG. 1, a 1 ms subframe 100 is illustrated, in which a physical layer channel transmitting data and DM RSs are configured. Subframe 100 includes two slots 101 and 102, and each slot 101 and 102 includes seven SC-FDMA symbols 103. One SC-FDMA symbol positioned at a center of each slot 101 and 102 is mapped with a DM RS 104 and 105. The size of frequency phases in the physical layer channel is determined depending on the amount of frequency resources occupied by a terminal for transmission of data and DM RSs, and may be a multiple of a resource block (RB) unit constituted of twelve subcarriers.

Figure 2:
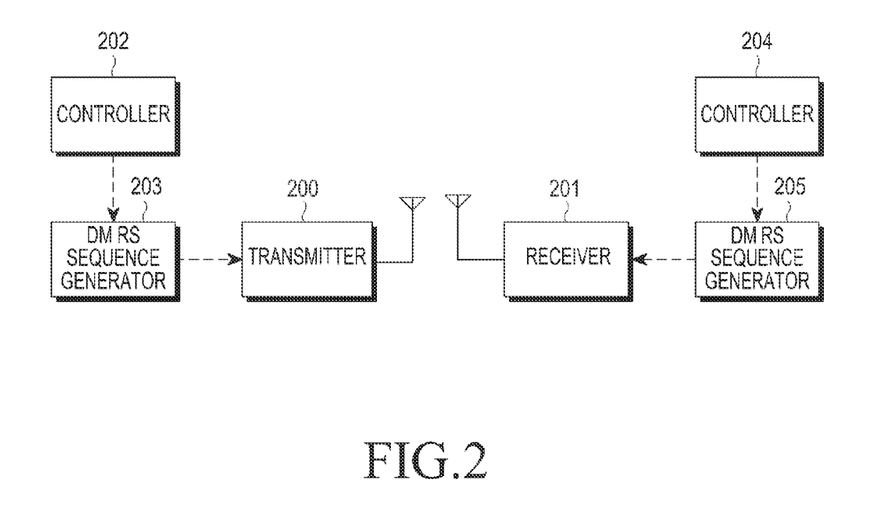
FIG. 2 is a view illustrating an apparatus for generating and communicating a demodulation reference signal (DM RS) in a wireless communication system according to an embodiment of the present disclosure.

FIG. 2 is a view illustrating an apparatus for generating and communicating a DM RS in a wireless communication system according to an embodiment of the present disclosure.

Referring to FIG. 2, a transmitter 200, a receiver 201, a controller 202, a DM RS sequence generator 203, a controller 204 and a DM RS sequence generator 205 are illustrated, where the transmitter 200 and the receiver 201 communicate data with each other using D2D communications. Now described is an example in which the transmitter 200 transmits data to the receiver 201, but the transmitter 200 may receive data while the receiver 201 may transmit data. The transmitter 200 and the receiver 201 may be D2D terminals.

The DM RS sequence generator 203 generates at least one DM RS sequence using parameters necessary for generating a DM RS determined by the controller 202. The transmitter 200 may map the at least one DM RS sequence input from the DM RS sequence generator 203 to a predetermined DM RS resource position, and if there is data to be transmitted, may transmit the DM RS along with the data.

The receiver 201 receives the data and the DM RS from the transmitter 200. In this case, the DM RS sequence generator 205 may generate a DM RS sequence using parameters necessary for generating a DM RS determined by the controller 204, and the receiver 201 may perform correlation on predetermined symbol positions of a DM RS resource using the DM RS sequence input from the DM RS sequence generator 205 and decode data using channel state information estimated based on the result of the correlation.

D2D communication signal transmitting and receiving devices may obtain at least one of an identity of the D2D signal transmitting device, an identity of the D2D signal receiving device, an identity with a predetermined value, a synchronization identity identifying a synchronization source, an identity of a service group, an identity of a task group, and an identity of a resource pool configured for D2D communication and generate at least one DM RS sequence for D2D communication based on at least one of the obtained identities. Here, the synchronization source is an entity to transmit a synchronization signal for D2D communication, and an example thereof may be a specific terminal or base station. As an example, the synchronization identity may be designated as a value included in the synchronization source or may be designated by the base station.

The service group may include terminals registered as fire fighters or security agents or may mean a group of terminals interested in a specific service, for example. The task group may include, e.g., terminals positioned in a specific area or terminals with predetermined purposes of communication. The terminal may include, in a control signal, a group identify of a communication group which the terminal is interested in, and transmit the same. The terminal may obtain the group identity of the communication group which the terminal is interested in from the received control signal.

The input parameters for generating a DM RS sequence, including the identities, may be used to determine a sequence index or input parameters constituting a cyclic shift value of the sequence, as well as the above-described identities, and each terminal may recognize or obtain the input parameters in different manners depending on communication environments of the terminal.

Further, the input parameters may be configured to be distinguished depending on types of discovery processes. In other words, the types of discovery processes may be distinguished depending on open/restricted discovery or whether the target for discovery is specified or unspecified.

In a circumstance where the D2D terminal may receive system information from the network, the D2D terminal, upon performing a discovery process, may be signaled with a possible pool of the input parameters used for generating a DM RS through the system information and may use the input parameters of the pool, thus reducing the complexity of the terminal receiving a discovery signal. Upon failing to receive separate input parameter information, the terminal may attempt to detect a DM RS sequence blindly for all possible input parameter values.

Lastly, at least one of the above-described methods may be put to use in generating other sequence such as preambles used in D2D communications.

Now described are specific embodiments for determining generation of a DM RS performed by the controllers 202 and 204 and the DM RS sequence generators 203 and 205.

First Embodiment

According to this embodiment, generation of a sequence constituting a DM RS may be determined using a function that is based on at least one of a first parameter, a second parameter, and a third parameter as described below. An equation for generating a sequence constituting a DM RS is shown in Equation 1.

$$r_{DMRS}(m \cdot M_{sc}^{RS}+n)=w(m)r_u^{(\alpha)}(n) \quad \text{Equation 1}$$

Here, $r_{DMRS}(m \cdot M_{sc}^{RS}+n)$ refers to an nth element (n=0, 1, ..., $M_{sc}^{RS}-1$) of an mth DM RS in a subframe. $M_{sc}^{RS}$ refers to a length of a sequence constituting one DM RS. w(m) refers to an mth element of an orthogonal code multiplied with an mth DM RS sequence in the subframe. The orthogonal code of w(m) might not necessarily apply and may be omitted. When the orthogonal code is omitted may show the same effect as when all of the elements of w(m) are 1's.

$r_u^{(\alpha)}(n)$ is an nth element of a sequence distinguishable by cyclic shift value $\alpha$, and an example thereof is a Zadoff-Chu (ZC) sequence. Here, u refers to an index of the sequence. The cyclic shift value, $\alpha$, may be a value in a predetermined set, and it may be defined as follows: $\alpha=2\pi n_{CS}/N$. Here, $n_{CS}$ is a value determined by at least one of the first parameter, the second parameter, and the third parameter, and N is a predetermined constant.

The first parameter is a value transferred to each terminal through higher layer signaling, and the second parameter is a value signaled from the latest data allocation information received by the terminal. The data allocation information means control information transmitted from the base station to indicate the allocation of the resource where data is communicated. Finally, the third parameter is a value determined by at least one of an identity, and the above-described first parameter and second parameter.

The identity may include at least one of an identity of the data transmitting terminal transmitting a DM RS, an identity of the data receiving terminal receiving a DM RS, a synchronization identity of a synchronization source relating to the data transmitting terminal transmitting a DM RS, an identity of a communication group (e.g., a service group or task group) where the data transmitting terminal transmitting a DM RS belongs, an identity of a resource set configured for D2D communication, and a predetermined identity. Further, u may be at least one of a predetermined value or a value set by the base station.

A base station may perform the overall control on the D2D communication. As an example, the base station may allocate physical resources for transmitting a DM RS and data of each D2D terminal and may control the determination of the cyclic shift value of the DM RS through higher layer signaling.

Second Embodiment

Similar to the above-described first embodiment, the second embodiment generates a sequence constituting a DM RS according to a predetermined generation equation based on at least one of a first parameter, a second parameter, and a third parameter.

Here, the first parameter is a value transferred to each terminal through higher layer signaling, and the second parameter is a predetermined value. Lastly, the third parameter is a value determined by at least one of an identity, and the above-described first parameter and second parameter.

The identity may include at least one of an identity of a transmitting terminal transmitting a DM RS and data, an identity of a receiving terminal receiving a DM RS and data, a synchronization identity of a synchronization source relating to the transmitting terminal transmitting a DM RS and data, an identity of a communication group where the transmitting terminal transmitting a DM RS and data belongs, an identity of a resource set configured for D2D communication, and a predetermined identity.

A base station partially controls the D2D communication, but might not allocate physical resources for transmitting a DM RS and data of each D2D terminal. As an example, the base station may control the cyclic shift value, a, of the DM RS through higher layer signaling.

The base station might not allocate physical resources for transmitting a DM RS and data of the D2D terminal, and the terminal may determine whether there is an empty available physical resource through energy sensing within a physical resource region. Upon determining that there is an available physical resource, the terminal may thereafter hold the transmission of a DM RS and data while conducting energy sensing during a back-off time period randomly set. If there are no other signals in the corresponding physical resource during the back-off time period, the terminal may transmit data and a DM RS in the corresponding physical resource. If there are other signals, the terminal may explore again available physical resources while conducting energy sensing on the physical resource region for D2D.

Third Embodiment

Similar to the above-described first embodiment, the third embodiment generates a sequence constituting a DM RS according to a predetermined generation equation based on at least one of a first parameter, a second parameter, and a third parameter.

Here, the first parameter is a predetermined value, and the second parameter is a value signaled from the latest data allocation information received by the terminal Lastly, the third parameter is a value determined by at least one of an identity and the above-described first parameter and second parameter.

The identity may include at least one of an identity of a data transmitting terminal transmitting a DM RS, an identity of a data receiving terminal receiving a DM RS, a synchronization identity of a synchronization source relating to the data transmitting terminal transmitting a DM RS, an identity of a communication group where the data transmitting terminal transmitting a DM RS belongs, an identity of a resource set configured for D2D communication, and a predetermined identity.

A base station partially controls the D2D communication, but might not control the determination of the cyclic shift value of the DM RS through higher layer signaling. As an example, the base station may allocate physical resources for transmission of a DM RS and data of each D2D terminal.

Fourth Embodiment

Similar to the above-described first embodiment, the fourth embodiment generates a sequence constituting a DM RS according to a predetermined generation equation based on at least one of a first parameter, a second parameter, and a third parameter.

Here, the first parameter and the second parameter are predetermined values. The third parameter is a value determined by at least one of an identity and the above-described first parameter and second parameter.

The identity may include at least one of an identity of a data transmitting terminal transmitting a DM RS, an identity of a data receiving terminal receiving a DM RS, a synchronization identity of a synchronization source relating to the data transmitting terminal transmitting a DM RS, an identity of a communication group where the data transmitting terminal transmitting a DM RS belongs, an identity of a resource set configured for D2D communication, and a predetermined identity.

By way of example, the instant embodiment may be adopted when a base station cannot control the D2D communication. As an example, this embodiment may be used when the base station network cannot normally provide services to the terminals in the coverage due to, e.g., a natural disaster or when a terminal should conduct D2D communication in the area with no base station network. Under such circumstance, none of the terminals can be allocated with physical resources for transmission of a DM RS and data or higher layer signaling from a base station, and the first parameter and second parameter related thereto may be replaced with a predetermined value that has been already known to all the terminals.

In an embodiment, the terminal, in a case where the first or second parameter received from the base station is invalid, replaces the first or second parameter with the predetermined value.

Fifth Embodiment

Similar to the above described first embodiment, the fifth embodiment generates a sequence constituting a DM RS according to a predetermined generation equation based on at least one of a first parameter, a second parameter, and a third parameter. In an embodiment, the generation equation may be Equation 1 above.

In an embodiment, $n_{CS}$ in Equation 1 may be determined by the following Equation 2:

$$n_{cs} = (n_{DMRS}^{(1)} + n_{DMRS}^{(2)} + n_{PN}(n_s)) \bmod M \qquad \text{Equation 2)}$$

Here, $n_{DMRS}^{(1)}$ is a cyclic shift value transferred to the terminal through higher layer signaling and may correspond to the above described first parameter. $n_{DMRS}^{(2)}$ is a cyclic shift value signaled from the latest data allocation information received by the terminal and may correspond to the above described second parameter. $n_{PN}(n_s)$ is a value determined by at least one of an identity and the above described first parameter and second parameter and may correspond to the above described third parameter.

The identity may include at least one of an identity of a data transmitting terminal transmitting a DM RS, an identity of a data receiving terminal receiving a DM RS, a synchronization identity of a synchronization source relating to the data transmitting terminal transmitting a DM RS, an identity of a communication group where the data transmitting terminal transmitting a DM RS belongs, an identity of a resource set configured for D2D communication, and a predetermined identity. $n_s$ is a slot index, and M is a predetermined constant.

Sixth Embodiment

The sixth embodiment generates a sequence constituting a DM RS of a discovery signal necessary for performing an inter-D2D terminal discovery operation using a generation equation that is based on at least one of a first parameter, a second parameter, and a third parameter. An example of the generation equation is given in Equation 3 below.

$$r_{DMRS}(m \cdot M_{sc}^{RS}+n)=w(m)r_u^{(\alpha)}(n) \quad \text{Equation 3}$$

Here, $r_{DMRS}(m \cdot M_{sc}^{RS}+n)$ refers to an nth element (n=0, 1, ..., $M_{sc}^{RS}-2$) of an mth DM RS in a subframe. $M_{sc}^{RS}$ refers to a length of a sequence constituting one DM RS. w(m) refers to an mth element of an orthogonal code multiplied with an mth DM RS in the subframe. The orthogonal code of w(m) may be omitted without necessarily applied. The omission might show the same effect as when all of the elements in w(m) are 1's.

$r_u^{(\alpha)}(n)$ is an nth element of a sequence distinguishable by the cyclic shift value, $\alpha$, and an example thereof is a ZC sequence. Here, u refers to an index of the sequence. The cyclic shift value, $\alpha$, may be a value within a predetermined set, and may be defined by $\alpha=2\pi n_{CS}/N$. Here, $n_{CS}$ is a value determined by at least one of a first parameter, a second parameter, and a third parameter, and N is a predetermined constant.

If higher layer signaling to the terminals is possible, that is, in a case where the terminals are in the RRC_CONNECTED state, the first parameter may be transferred to each terminal through higher layer signaling, and unless higher layer signaling to the terminals are possible, that is, in a case where the terminals are in the RRC_IDLE state, a predetermined value may come in use.

In an embodiment, in a case where a target (opposing peer device), which should receive a discovery signal, is unspecified or in a case of an open discovery operation, a predetermined value may be used as the first parameter. In an embodiment, in a case where a target (a peer device), which should receive a discovery signal, is specified or in a case of a restricted discovery operation, the base station may signal each terminal with the first parameter through higher layer signaling.

The second parameter may be signaled from the latest discovery signal allocation information received by the terminal. The discovery signal allocation information means control information transmitted from the base station to indicate the data resource where the discovery signal is communicated. Under the circumstance where the terminal cannot be allocated a discovery signal resource by the base station, a predetermined value may be used as the second parameter.

In an embodiment, even when the base station can allocate discovery signal resources, if the target which should receive the discovery signal is unspecified or in a case of an open discovery operation, a predetermined value may be used as the second parameter. In an embodiment, in a case where the target, which should receive the discovery signal, is specified or in a case of a restricted discovery operation, the base station may give the second parameter to each terminal through discovery signal allocation.

The third parameter is a value determined by at least one of an identity and the above described first parameter and second parameter. The identity may include at least one of an identity of a data transmitting terminal transmitting a DM RS, an identity of a data receiving terminal receiving a DM RS, a synchronization identity of a synchronization source relating to the data transmitting terminal transmitting a DM RS, an identity of a communication group where the data transmitting terminal transmitting a DM RS belongs, an identity of a resource set configured for D2D communication, and a predetermined identity. U may be at least one of a predetermined value or a value set by the base station.

In an embodiment, in a case where the target, which should receive the discovery signal, is unspecified or in a case of an open discovery operation, a predetermined value may be used as the identity, $N_{ID}^{Anonymous}$, for determining the third parameter. Alternatively, in a case where the target which should receive the discovery signal or in a case of a restricted discovery operation, a unique identity, $N_{ID}^{Target}$, of the group where the specified target belongs or the restricted group where the specified target belongs may be used to determine the third parameter.

Seventh Embodiment

According to the seventh embodiment, in a case where the D2D terminal should conduct blind detection while receiving a DM RS (for example, when it cannot receive DM RS generation-related information), a base station provides, through system information to each terminal, at least one set constituted of values available on at least one of a first parameter, a second parameter, and a third parameter or constituted of available DM RS sequences in order to reduce the complexity of the DM RS detection of the terminal.

When receiving the system information, the terminal may attempt blind detection using available DM RS sequences or available values in the set. In an embodiment, in a case the transmitting D2D terminal is configured to apply different cyclic shift values to generation of DM RSs, with the others remaining the same, the receiving D2D terminal may attempt blind detection on all possible DM RS sequence cyclic shift values without separate signaling.

Eighth Embodiment

According to the eighth embodiment, a discovery signal includes a message containing information regarding a terminal transmitting the discovery signal, a discovery preamble and a DM RS for demodulating the message. The discovery preamble may be generated as described below. Here, the discovery preamble may be used as, e.g., an additional sequence for more exactly syncing the discovery signal or supporting DM RS channel estimation.

In an embodiment, the discovery preamble may be constituted of the same sequence of a DM RS, and the generation schemes according to the embodiments described above may apply to generation of the discovery preamble. In an embodiment, the discovery preamble may include a DM RS and other sequence, and an equation for generating the discovery preamble is given in the following Equation 4, for example.

$$r(n)=r_u^{(\alpha)}(n) \quad \text{Equation 4}$$

Here, r(n) refers to an nth element (n=0, 1, ..., N−1) of the discovery preamble. N refers to a length of a sequence constituting a discovery preamble. $r_u^{(\alpha)}(n)$ is an nth element of a sequence distinguishable by a cyclic shift value $\alpha$, and an example thereof is a ZC sequence. Here, u refers to an index of the sequence. The cyclic shift value, $\alpha$, may be a value within a predetermined set, and may be defined by $\alpha=2\pi n/M$. M is a predetermined constant.

In an embodiment, m, in a case where higher layer signaling to each terminal is possible, that is, when the terminals are in the RRC_CONNECTED state, is transferred to each terminal through higher layer signaling. In an embodiment, unless higher layer signaling to each terminal is possible, that is, when the terminals are in the RRC_IDLE state, a predetermined value may be used as m.

Alternatively, in a case where the target, which should receive the discovery signal, is unspecified or in a case of an open discovery operation, a predetermined value may be used as m. In an embodiment, in a case where the target, which should receive the discovery signal, is specified or in a case of a restricted discovery operation, the base station may give m to each terminal through higher layer signaling.

Ninth Embodiment

According to the ninth embodiment, a discovery signal includes a message containing information regarding a terminal transmitting the discovery signal, a discovery preamble and a DM RS for demodulating the message. The discovery preamble may be generated as described below. Here, the discovery preamble may be used as, e.g., an additional sequence for more exactly syncing the discovery signal, supporting DM RS channel estimation, or as a signal strength measuring sequence for configuring the automatic gain controller of the terminal.

In an embodiment, the discovery preamble may be constituted of the same sequence of a DM RS, and the generation schemes according to the embodiments described above may apply to generation of the discovery preamble. In an embodiment, the discovery preamble may include a DM RS and other sequence, and an equation for generating the discovery preamble is given in the following Equation 5, for example.

$$x_u(n) = x_u((n+C) \bmod N_{ZC}) \qquad \text{Equation 5}$$

Here, $x_u(n)$ refers to an nth element (n=0, 1, ..., N-1) of the discovery preamble. N refers to a length of a sequence constituting a discovery preamble. Further, it is a sequence distinguishable by a cyclic shift value C, and an example thereof is a ZC sequence. Here, u refers to an index of the sequence. The cyclic shift value, C, may be a value within a predetermined set.

In an embodiment, in a case where higher layer signaling to each terminal is possible, that is, when the terminals are in the RRC_CONNECTED state, the cyclic shift value may be transferred to each terminal through higher layer signaling. In an embodiment, unless higher layer signaling to each terminal is possible, that is, when the terminals are in the RRC_IDLE state, a predetermined value may be used as the cyclic shift value.

Alternatively, in a case where the target, which should receive the discovery signal, is unspecified or in a case of an open discovery operation, a predetermined value may be used as the cyclic shift value. In an embodiment, in a case where the target, which should receive the discovery signal, is specified or in a case of a restricted discovery operation, the base station may give the cyclic shift value to each terminal through higher layer signaling.

Figure 3:
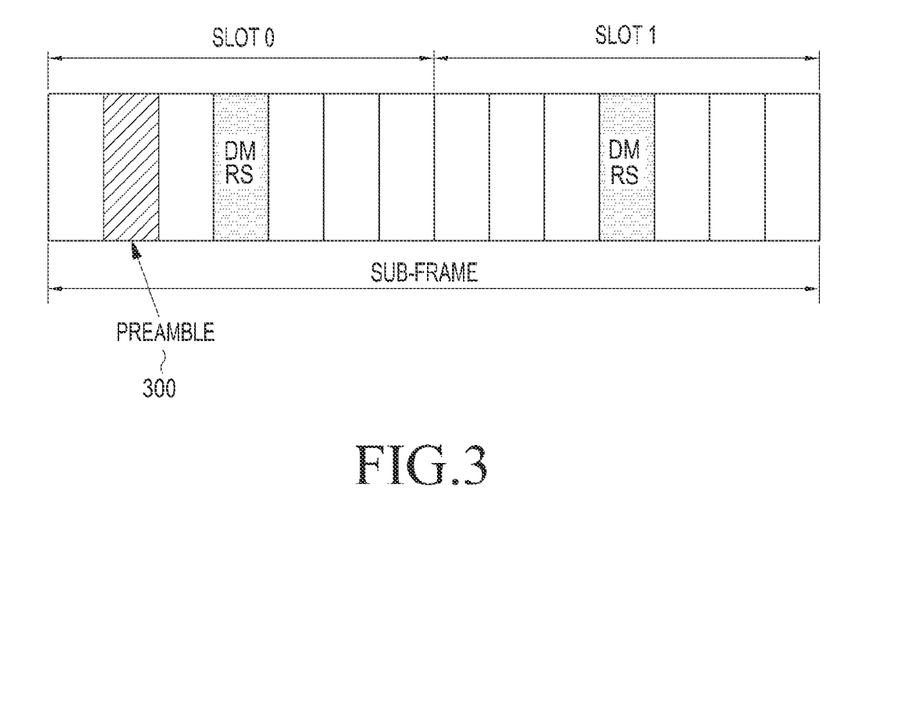
FIG. 3 is a view illustrating an architecture of a physical layer channel according to an embodiment of the present disclosure.

FIG. 3 is a view illustrating an architecture of a physical layer channel according to an embodiment of the present disclosure.

Referring to FIG. 3, a subframe having two slots (i.e., slot 0 and slot 1) is illustrated, such that a first SC-FDMA symbol in the subframe is used as a protection section and thus cannot be mapped with a signal, a fourth SC-FDMA symbol in each slot is mapped with a DM RS, and a preamble sequence 300 is mapped to a second SC-FDMA symbol in a first slot. The protection section is a time section configured so that a D2D terminal switches between a transmission mode and a reception mode when transmitting or receiving a signal to/from another D2D terminal.

As described above, the preamble may be used for measuring a signal strength to configure a terminal's automatic gain control (AGC) and it is thus preferable to position the preamble at a front side of the subframe.

Figure 4:
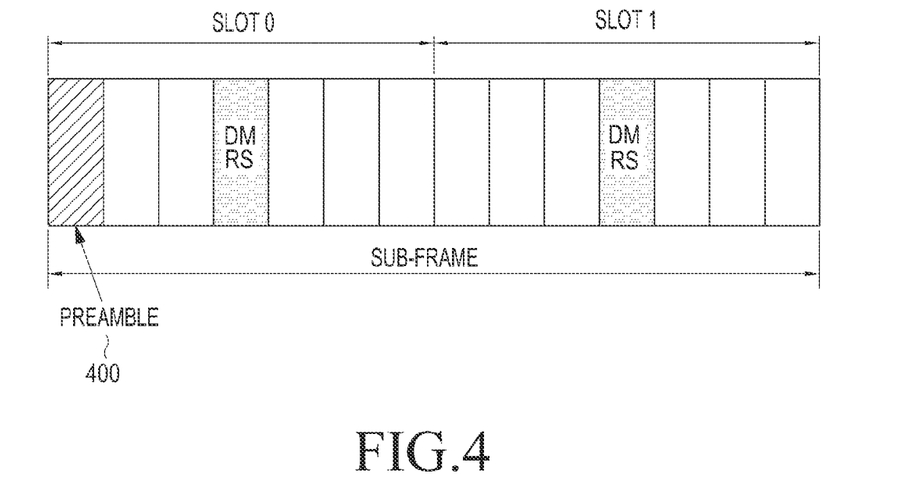
FIG. 4 is a view illustrating an architecture of a physical layer channel according to an embodiment of the present disclosure.

FIG. 4 is a view illustrating an architecture of a physical layer channel according to an embodiment of the present disclosure.

Referring to FIG. 4, a subframe having two slots (i.e., slot 0 and slot 1) is illustrated, such that a last SC-FDMA symbol in the subframe is used as a protection section and thus cannot be mapped with a signal, a fourth SC-FDMA symbol in each slot is mapped with a DM RS, and a preamble sequence 400 is mapped to a first SC-FDMA symbol in a first slot. In other words, since the first SC-FDMA symbol is not a protection section, a preamble is mapped to the first SC-FDMA symbol in one subframe to be used for measuring a signal strength.

Figure 5:
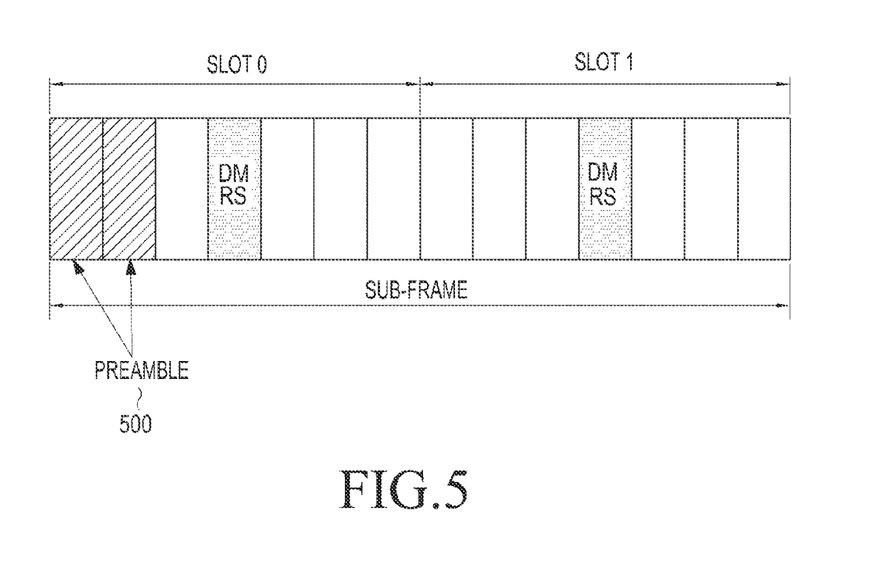
FIG. 5 is a view illustrating an architecture of a physical layer channel according to an embodiment of the present disclosure.

FIG. 5 is a view illustrating an architecture of a physical layer channel according to an embodiment of the present disclosure.

Referring to FIG. 5, a subframe having two slots (i.e., slot 0 and slot 1) is illustrated, such that a last SC-FDMA symbol in the subframe is used as a protection section and thus cannot be mapped with a signal, a fourth SC-FDMA symbol in each slot is mapped with a DM RS, and a preamble sequence 500 is mapped to the first and second SC-FDMA symbols in a first slot. In order to support DM RS channel estimation and discovery signal synchronization and to enhance the accuracy of information estimated from the preamble when the terminal backs up an AGC configuration, a preamble may be mapped to multiple SC-FDMA symbols as shown. The number of SC-FDMA symbols mapped with a preamble is not limited to two, and more SC-FDMA symbols may be mapped with a preamble.

Figure 6:
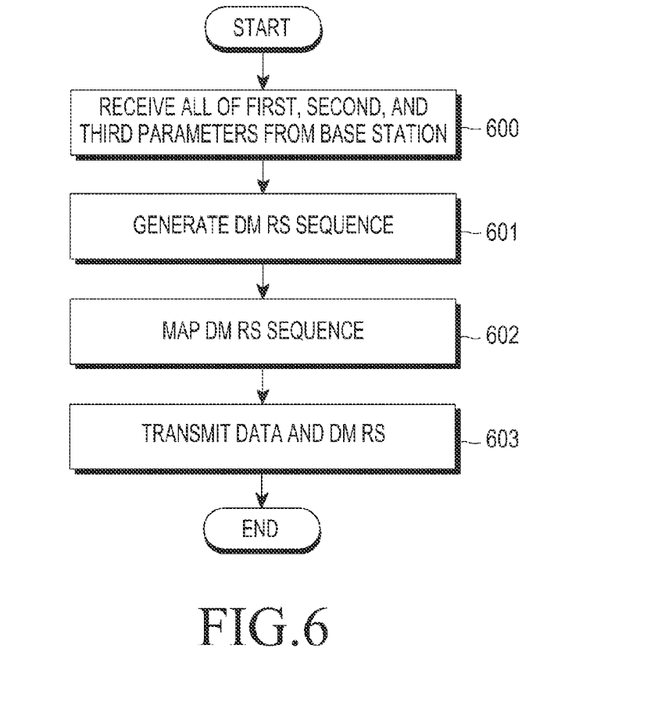
FIG. 6 is a flowchart illustrating a procedure of generating and transmitting a DM RS by a terminal according to an embodiment of the present disclosure.

FIG. 6 is a flowchart illustrating a procedure of generating and transmitting a DM RS by a terminal according to an embodiment of the present disclosure. The procedure shown may be adopted for a situation where the terminal is positioned in a coverage of a base station and the base station has full control over a D2D communication or discovery operation.

Referring to FIG. 6, a flowchart is illustrated, such that in operation 600 a terminal receives the above-described first, second, and third parameters from a base station to obtain information necessary for generating a DM RS sequence.

In operation 601, the terminal generates a DM RS sequence according to a predetermined generation equation, using the parameters.

Next, in operation 602, the terminal maps the generated DM RS sequence to predetermined DM RS symbol positions in a subframe.

Lastly, in operation 603, the terminal transmits data and the DM RS sequence in the subframe.

Figure 7:
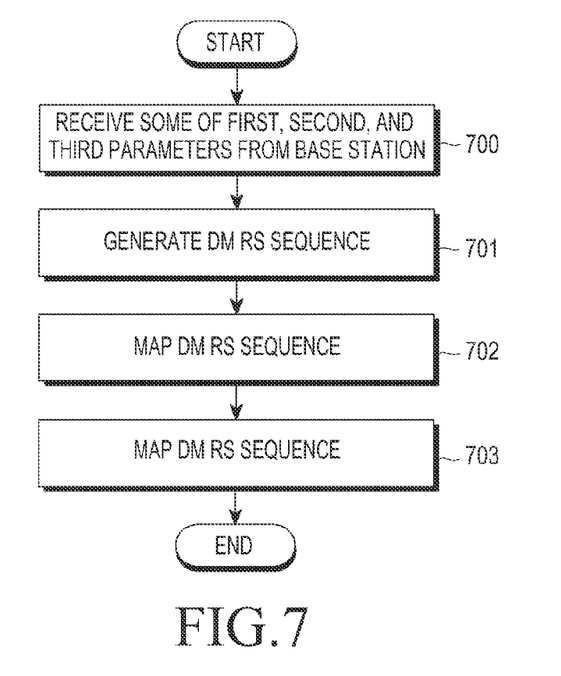
FIG. 7 is a flowchart illustrating a procedure of generating and transmitting a DM RS by a terminal according to an embodiment of the present disclosure.

FIG. 7 is a flowchart illustrating a procedure of generating and transmitting a DM RS by a terminal according to an embodiment of the present disclosure. The procedure shown may be adopted for a circumstance where the terminal is positioned in a coverage of a base station, and the base station has partial control over a D2D communication or discovery operation.

Referring to FIG. 7, a flowchart is illustrated, such that in operation 700 a terminal receives some of the above-described first, second, and third parameters from a base station to obtain information necessary for generating a DM RS sequence.

In operation 701, the terminal generates a DM RS sequence according to a predetermined generation equation, using the parameters.

Next, in operation 702, the terminal maps the generated DM RS sequence to predetermined DM RS symbol positions in a subframe.

Lastly, in operation 703, the terminal transmits data and the DM RS sequence in the subframe.

The procedure shown in FIG. 7 may be employed in a situation where the base station controls the operation of each terminal through higher layer signaling, controlling only some available resource region among the resources used by each terminal for D2D communication or discovery operation while leaving to each terminal's discretion the determination as to the resources actually used for D2D communication or discovery operation in the available resource region. In an embodiment, the procedure shown in FIG. 7 may come in use for a case where the base station allocates all of the resources to be used by each terminal for D2D communication or discovery operation without controlling the operation of each terminal through higher layer signaling. At least one parameter that cannot be received from the base station may be replaced with a predetermined value.

Figure 8:
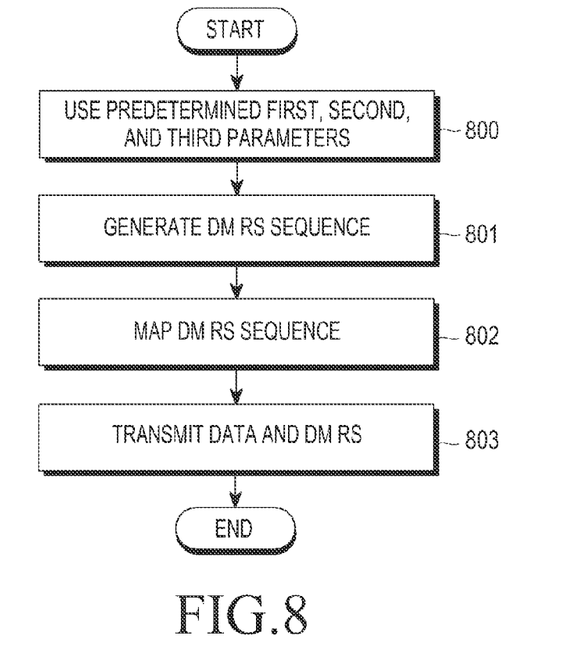
FIG. 8 is a flowchart illustrating a procedure of generating and transmitting a DM RS by a terminal according to an embodiment of the present disclosure.

FIG. 8 is a flowchart illustrating a procedure of generating and transmitting a DM RS by a terminal according to an embodiment of the present disclosure. The procedure shown may be used in a scenario where the terminal is positioned outside the coverage of the base station.

Referring to FIG. 8, a flowchart is illustrated, such that in operation 800 a terminal determines to use values set for D2D communications for the above-described first, second, and third parameters.

In operation 801, the terminal generates a DM RS sequence using the parameters.

Next, in operation 802, the terminal maps the generated DM RS sequence to predetermined DM RS symbol positions in a subframe.

Lastly, in operation 803, the terminal transmits data and the DM RS sequence in the subframe.

The procedure of FIG. 8 may be used for D2D communication between the terminals respectively belonging to coverage of different base stations or a case where, although the two terminals belong to the coverage of a single base station, a discovery operation for inter-terminal D2D communication needs to be supported, such as, e.g., when firefighters, police officers, or other group members need to communicate with each other for public safety under an emergency or when a discovery operation should be done for all the terminals.

The above described method for generating a DM RS sequence and preamble may be applicable to initializing the generation of a scrambling sequence used to randomize D2D communication channel interference.

The above described embodiments of the present disclosure provide schemes of configuring input parameters necessary for generating DM RS and preamble sequences and specific generation functions using the input parameters in order for the terminal to generate DM RS and preamble sequences appropriate for a D2D communication environment, thus enabling seamless D2D communications. Further, the embodiments do not require additional signaling overheads for sharing the information relating to the DM RS and preamble sequences between the transmitting terminal and the receiving terminal in the D2D communication process.

Tenth Embodiment

According to the tenth embodiment a method is proposed for generating a data DM RS in a D2D communication to randomize interference with a physical uplink shared channel (PUSCH) DM RS sequence generated by the method described above in connection with Equations 6, 7, and 8 under a wide area network (WAN) environment.

In the WAN, a sequence group number u for the PUSCH DM RS sequence of slot $n_s$ may be determined as in the following Equation 6:

$$u=(f_{gh}(n_s)+f_{ss}) \bmod 30 \qquad \text{Equation 6}$$

Here, $f_{gh}(n_s)$ is a sequence hopping pattern, and $f_{ss}$ is a sequence shift pattern.

The group hopping may be enabled or disabled by a cell-specific higher layer parameter. Further, even when the sequence group hopping has been enabled by the cell-specific parameter, the sequence group hopping on a specific terminal may be disabled by a separate higher layer parameter.

The sequence group hopping may be defined as in the following Equation 7:

$$f_{gh}(n_s) = \begin{cases} 0 & \text{if group } hopping \text{ is disabled} \\ \left(\sum_{i=0}^{7} c(8n_s + i) \cdot 2^i\right) \bmod 30 & \text{if group } hopping \text{ is enabled} \end{cases} \qquad \text{Equation 7}$$

Here, c(i) is a pseudo random sequence, and upon generating the sequence, initialization may be determined by $$c_{init} = \left\lfloor \frac{n_{ID}^{RS}}{30} \right\rfloor$$

at the start time of each radio frame (including the subframes). $n_{ID}^{RS}$ may have a value from 0 to 509. The sequence shift pattern, $f_{ss}$, may be determined as one of 30 patterns by a predetermined higher layer value and $n_{ID}^{RS}$ or cell ID.

$$v = \begin{cases} c(n_s) & \text{if group hopping is disabled and} \\ & \text{sequence hopping is enabled} \\ 0 & \text{otherwise} \end{cases} \qquad \text{Equation 8}$$

Here, c(i) is a pseudo random sequence, and upon generating the sequence, initialization may be determined by $$c_{init} = \left\lfloor \frac{n_{ID}^{RS}}{30} \right\rfloor \cdot 2^5 + f_{ss}$$

at the start time of each radio frame (including ten subframes)

In an embodiment, upon generating a data DM RS in a D2D communication, a value unused in $n_{ID}^{RS}$ may be used as an input parameter of the DM RS sequence group hopping and sequence hopping function. For example, $n_{ID}^{RS}$ may have a value from 0 to 509 for WAN, as described above. Upon generating a data DM RS for D2D communication, a value, e.g., 540, other than the values used for WLAN may be used as an input parameter of the DM RS sequence group hopping and sequence hopping function.

When the above method comes in use, the DM RS sequence group hopping and sequence hopping pattern owned by the D2D data DM RS has a pseudo random pattern different from the DM RS sequence group hopping and sequence hopping pattern owned by the PUSCH DM RS in the case of WAN, thus providing the effect of randomizing interference between the D2D data DM RS and the WAN PUSCH DM RS. The value used for generating the D2D data DM RS is not limited to what has been mentioned in this embodiment, and various values unused upon generation of the WAN PUSCH DM RS may apply.

For example, the above described initialization function, $$c_{init} = \left\lfloor \frac{n_{ID}^{RS}}{30} \right\rfloor \text{ and } c_{init} = \left\lfloor \frac{n_{ID}^{RS}}{30} \right\rfloor \cdot 2^5 + f_{ss},$$

for WAN, when the method according to this embodiment applies, may turn into $$c_{init} = \left\lfloor \frac{K}{30} \right\rfloor \text{ and } c_{init} = \left\lfloor \frac{K'}{30} \right\rfloor \cdot 2^5 + f_{ss}.$$

Here, K and K' are constants, and K=K' or K≠K'. In this case, $c_{init}$=N or $c_{init}$=N'. In a case of using the above-described value, e.g., 540, $$c_{init} = \left\lfloor \frac{K}{30} \right\rfloor$$

may become $c_{init}$=18. The denominators in the initialization functions mentioned above in connection with this embodiment is not limited to 30, and may be any other constant value. The denominators used in the initialization functions may be the same or different from each other.

The input parameter for at least one of the two initialization functions may be a constant among values that are not used as $n_{ID}^{RS}$ for WAN. The input parameter of the other function may be an identity (ID) (e.g., a group identity) indicated through a scheduling assignment (SA) used for data resource allocation in D2D. The initialization function receiving the value unused in $n_{ID}^{RS}$ for WAN through the above method is used for interference randomization between the D2D DM RS and the WAN DM RS, and the other initialization function receiving the ID indicated through the SA may be used for interference randomization between D2D DM RSs.

As described above, at least one of the pseudo random pattern initialization functions used for generating D2D DM RSs needs to use the value unused upon generating the WAN DM RS as an input parameter in order to obtain the effect of randomizing the interference between the DM RS used in WAN and the DM RS used in D2D. The following table summarizes specific methods for achieving such objects.

TABLE 1

|  | Sequence group hopping | Sequence hopping | |
|---|---|---|---|
|  | $n_{ID}^{RS}$ | $n_{ID}^{RS}$ | $f_{ss}$ |
| Case 1 | K | K | M |
| Case 2 | K | K' | M |
| Case 3 | K | ID indicated by SA | M |
| Case 4 | ID indicated by SA | K or K' | M |
| Case 5 | K or K' | Synchronization source ID | M |
| Case 6 | Synchronization source ID | K or K' | M |

As an example, if case 4 applies to sequence group hopping, the ID (e.g., a group identity) indicated by the SA, instead of $n_{ID}^{RS}$, may be used in determining the function of the sequence group hopping pattern. The sequence hopping pattern applies to the calculation of sequence group number u of the DM RS sequence for D2D communications.

As another example, if case 3 applies to sequence hopping, the ID (e.g., an initialization value $C_{init}$ obtained by the group identity) indicated by the SA, instead of $n_{ID}^{RS}$, may be used in calculating the sequence number v of the DM RS sequence.

The resultant values of the initialization based on Table 1 above may be summarized as follows:

TABLE 2

|  | Sequence group hopping $c_{init}$ | Sequence hopping $c_{init}$ |
|---|---|---|
| Case 1 | N | N |
| Case 2 | N | N' |
| Case 3 | N or N' | $c_{init}$ indicated by SA |
| Case 4 | $c_{init}$ indicated by SA | N or N' |

K, K', and M are constants. At least one of K and K' may be a constant larger than 509. M may remain the same or may not depending on cases.

Upon generating a pseudo random sequence in Equations 6, 7, and 8, different initialization functions and sequence shift functions may be defined for different RS sequences, e.g., a PUSCH DM RS, a PUCCH DM RS, and a sounding reference signal (SRS), and a method according to an embodiment may apply to the same in the same way to generate an RS signal for D2D communication.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A method for transmitting a reference signal for a device-to-device (D2D) communication, the method comprising:
   generating, by a controller of a terminal, a demodulation reference signal (DM RS) sequence for the D2D communication based on at least one of a synchronization identity of a synchronization signal used for the D2D communication and a group identity of a communication group where the terminal belongs; and
   transmitting, by a transceiver of the terminal, the DM RS sequence through predetermined symbol positions in a subframe, wherein the DM RS sequence is generated based on a pseudo random sequence, the pseudo random sequence generated based on an initialization value having a constant value, wherein the initialization value has the constant value for D2D communication different from a range of initialization values related to generation of a DM RS sequence for uplink transmission, and wherein, if the group identity is applied for the DM RS sequence, the DM RS sequence is generated by using a cyclic shift value determined based on the group identity.

2. The method of claim 1, wherein the generating of the DM RS sequence includes:

determining the cyclic shift value applied to the DM RS sequence based on the group identity;

determining an orthogonal code applied to the DM RS sequence; and generating the DM RS sequence by multiplying a reference signal (RS) sequence defined by the cyclic shift value with the orthogonal code.

3. The method of claim 1, wherein, if the synchronization identity is applied for the DM RS sequence, the generating of the DM RS sequence includes:

determining the cyclic shift value applied to the DM RS sequence based on the synchronization identity;

determining an orthogonal code applied to the DM RS sequence; and generating the DM RS sequence by multiplying a reference signal (RS) sequence defined by the cyclic shift value with the orthogonal code.

4. The method of claim 1, wherein the generating of the DM RS sequence includes:

determining a group hopping pattern of a slot; and determining a sequence group number of the slot regarding the DM RS sequence based on the group hopping pattern and a sequence shift pattern, wherein a function of the group hopping pattern is determined as 0 when group hopping is disabled, wherein the function of the group hopping pattern is determined based on a pseudo random sequence related to the slot when the group hopping is enabled, wherein the sequence shift pattern is determined based on the group identity, and wherein the pseudo random sequence is generated based on an initialization value defined by the group identity.

5. The method of claim 1, wherein the generating of the DM RS sequence includes:

determining a group hopping pattern of a slot; and determining a sequence group number of the slot regarding the DM RS sequence based on the group hopping pattern and a sequence shift pattern, wherein a function of the group hopping pattern is determined as 0 when group hopping is disabled, wherein the function of the group hopping pattern is determined based on a pseudo random sequence related to the slot when the group hopping is enabled, wherein the sequence shift pattern is determined based on a predetermined value, and wherein the pseudo random sequence is generated based on an initialization value defined by the group identity.

6. The method of claim 1, wherein the generating of the DM RS sequence includes:

determining a group hopping pattern of a slot; and determining a sequence group number of the slot regarding the DM RS sequence based on the group hopping pattern and a sequence shift pattern, wherein a function of the group hopping pattern is determined as 0 when group hopping is disabled, wherein the function of the group hopping pattern is determined based on a pseudo random sequence related to the slot when the group hopping is enabled, wherein the sequence shift pattern is determined based on the synchronization identity, and wherein the pseudo random sequence is generated based on an initialization value defined by the group identity.

7. The method of claim 1, wherein the generating of the DM RS sequence includes:

determining a sequence number of the DM RS sequence as 0 when a length of the DM RS sequence is smaller than six resource blocks (RBs);

determining the sequence number of the DM RS sequence as a pseudo random sequence when the length of the DM RS sequence is not smaller than the six RBs, when group hopping is disabled, and when sequence hopping is enabled; and determining the sequence number of the DM RS sequence as 0 when the length of the DM RS sequence is not smaller than the six RBs, and when the group hopping is enabled or the sequence hopping is disabled, and wherein the pseudo random sequence is generated based on an initialization value defined by the group identity.

8. The method of claim 1, further comprising receiving, from a base station, information regarding at least one of the synchronization identity and the group identity.

9. A method for receiving a reference signal for a device-to-device (D2D) communication, the method comprising:

generating, by a controller of a first terminal, a demodulation reference signal (DM RS) sequence for the D2D communication based on at least one of a synchronization identity of a synchronization signal used for the D2D communication and a group identity of a communication group where the first terminal belongs;

receiving, by a transceiver of the first terminal, a reference signal transmitted from a second terminal at predetermined symbol positions in a subframe; and estimating a channel state using the received reference signal and the generated DM RS sequence, wherein the DM RS sequence is generated based on a pseudo random sequence, the pseudo random sequence generated based on an initialization value having a constant value, wherein the initialization value has the constant value for D2D communication different from a range of initialization values related to generation of a DM RS sequence for uplink transmission, and wherein, if the group identity is applied for the DM RS sequence, the DM RS sequence is generated by using a cyclic shift value determined based on the group identity.

10. The method of claim 9, wherein the generating of the DM RS sequence includes:

determining the cyclic shift value applied to the DM RS sequence based on the group identity;

determining an orthogonal code applied to the DM RS sequence; and generating the DM RS sequence by multiplying a reference signal (RS) sequence defined by the cyclic shift value with the orthogonal code.

11. The method of claim 9, wherein, if the synchronization identity is applied for the DM RS sequence, the generating of the DM RS sequence includes:
determining the cyclic shift value applied to the DM RS sequence based on the synchronization identity;
determining an orthogonal code applied to the DM RS sequence; and
generating the DM RS sequence by multiplying a reference signal (RS) sequence defined by the cyclic shift value with the orthogonal code.

12. The method of claim 9,
wherein the generating of the DM RS sequence includes:
determining a group hopping pattern of a slot; and
determining a sequence group number of the slot regarding the DM RS sequence based on the group hopping pattern and a sequence shift pattern,
wherein a function of the group hopping pattern is determined as 0 when group hopping is disabled,
wherein the function of the group hopping pattern is determined based on a pseudo random sequence related to the slot when the group hopping is enabled,
wherein the sequence shift pattern is determined based on the group identity, and
wherein the pseudo random sequence is generated based on an initialization value defined by the group identity.

13. The method of claim 9,
wherein the generating of the DM RS sequence includes:
determining a group hopping pattern of a slot; and
determining a sequence group number of the slot regarding the DM RS sequence based on the group hopping pattern and a sequence shift pattern,
wherein a function of the group hopping pattern is determined as 0 when group hopping is disabled,
wherein the function of the group hopping pattern is determined based on a pseudo random sequence related to the slot when the group hopping is enabled,
wherein the sequence shift pattern is determined based on a predetermined value, and
wherein the pseudo random sequence is generated based on an initialization value defined by the group identity.

14. The method of claim 9,
wherein the generating of the DM RS sequence includes:
determining a group hopping pattern of a slot; and
determining a sequence group number of the slot regarding the DM RS sequence based on the group hopping pattern and a sequence shift pattern,
wherein a function of the group hopping pattern is determined as 0 when group hopping is disabled,
wherein the function of the group hopping pattern is determined based on a pseudo random sequence related to the slot when the group hopping is enabled,
wherein the sequence shift pattern is determined based on the synchronization identity, and
wherein the pseudo random sequence is generated based on an initialization value defined by the group identity.

15. The method of claim 9,
wherein the generating of the DM RS sequence includes:
determining a sequence number of the DM RS sequence as 0 when a length of the DM RS sequence is smaller than six resource blocks (RBs);
determining the sequence number of the DM RS sequence as a pseudo random sequence when the length of the DM RS sequence is not smaller than the six RBs, when group hopping is disabled, and when sequence hopping is enabled; and
determining the sequence number of the DM RS sequence as 0 when the length of the DM RS sequence is not smaller than the six RBs, and when the group hopping is enabled or the sequence hopping is disabled, and
wherein the pseudo random sequence is generated based on an initialization value defined by the group identity.

16. The method of claim 9, further comprising receiving, from a base station, information regarding at least one of the synchronization identity and the group identity.

17. An apparatus in a terminal for transmitting a reference signal for a device-to-device (D2D) communication, the apparatus comprising:
a controller configured to:
generate a demodulation reference signal (DM RS) sequence for the D2D communication based on at least one of a synchronization identity of a synchronization signal used for the D2D communication and a group identity of a communication group where the terminal belongs; and
a transmitter configured to:
transmit the DM RS sequence through predetermined symbol positions in a subframe,
wherein the DM RS sequence is generated based on a pseudo random sequence, the pseudo random sequence generated based on an initialization value having a constant value,
wherein the initialization value has the constant value for D2D communication different from a range of initialization values related to generation of a DM RS sequence for uplink transmission, and
wherein, if the group identity is applied for the DM RS sequence, the DM RS sequence is generated by using a cyclic shift value determined based on the group identity.

18. The apparatus of claim 17, wherein the controller is further configured to:
determine the cyclic shift value applied to the DM RS sequence based on the group identity;
determine an orthogonal code applied to the DM RS sequence; and
generate the DM RS sequence by multiplying a reference signal (RS) sequence defined by the cyclic shift value with the orthogonal code.

19. The apparatus of claim 17, wherein, if the synchronization identity is applied for the DM RS sequence, the controller is further configured to:
determine the cyclic shift value applied to the DM RS sequence based on the synchronization identity;
determine an orthogonal code applied to the DM RS sequence; and
generate the DM RS sequence by multiplying a reference signal (RS) sequence defined by the cyclic shift value with the orthogonal code.

20. The apparatus of claim 17,
wherein the controller is further configured to:
determine a group hopping pattern of a slot; and
determine a sequence group number of the slot regarding the DM RS sequence based on the group hopping pattern and a sequence shift pattern,
wherein a function of the group hopping pattern is determined as 0 when group hopping is disabled,
wherein the function of the group hopping pattern is determined based on a pseudo random sequence related to the slot when the group hopping is enabled,
wherein the sequence shift pattern is determined based on the group identity, and
wherein the pseudo random sequence is generated based on an initialization value defined by the group identity.

21. The apparatus of claim 17,
wherein the controller is further configured to:
  determine a group hopping pattern of a slot; and
  determine a sequence group number of the slot regarding the DM RS sequence based on the group hopping pattern and a sequence shift pattern,
wherein a function of the group hopping pattern is determined as 0 when group hopping is disabled,
wherein the function of the group hopping pattern is determined based on a pseudo random sequence related to the slot when the group hopping is enabled,
wherein the sequence shift pattern is determined based on a predetermined value, and
wherein the pseudo random sequence is generated based on an initialization value defined by the group identity.

22. The apparatus of claim 17,
wherein the controller is further configured to:
  determine a group hopping pattern of a slot; and
  determine a sequence group number of the slot regarding the DM RS sequence based on the group hopping pattern and a sequence shift pattern,
wherein a function of the group hopping pattern is determined as 0 when group hopping is disabled,
wherein the function of the group hopping pattern is determined based on a pseudo random sequence related to the slot when the group hopping is enabled,
wherein the sequence shift pattern is determined based on the synchronization identity, and
wherein the pseudo random sequence is generated based on an initialization value defined by the group identity.

23. The apparatus of claim 17,
wherein the controller is further configured to:
  determine a sequence number of the DM RS sequence as 0 when a length of the DM RS sequence is smaller than six resource blocks (RBs);
  determine the sequence number of the DM RS sequence as a pseudo random sequence when the length of the DM RS sequence is not smaller than the six RBs, when group hopping is disabled, and when sequence hopping is enabled; and
  determine the sequence number of the DM RS sequence as 0 when the length of the DM RS sequence is not smaller than the six RBs, and when the group hopping is enabled or the sequence hopping is disabled, and
wherein the pseudo random sequence is generated based on an initialization value defined by the group identity.

24. The apparatus of claim 17, further comprising a receiver configured to receive, from a base station, information regarding at least one of the synchronization identity and the group identity.

25. An apparatus in a first terminal for receiving a reference signal for a device-to-device (D2D) communication, the apparatus comprising:
  a controller configured to:
    generate a demodulation reference signal (DM RS) sequence for the D2D communication based on at least one of a synchronization identity of a synchronization signal used for the D2D communication and a group identity of a communication group where the first terminal belongs; and
  a receiver configured to:
    receive a reference signal transmitted from a second terminal at predetermined symbol positions in a subframe,
wherein the controller is further configured to estimate a channel state using the received reference signal and the generated DM RS sequence,
wherein the DM RS sequence is generated based on a pseudo random sequence, the pseudo random sequence generated based on an initialization value having a constant value,
wherein the initialization value has the constant value for D2D communication different from a range of initialization values related to generation of a DM RS sequence for uplink transmission, and
wherein, if the group identity is applied for the DM RS sequence, the DM RS sequence is generated by using a cyclic shift value determined based on the group identity.

26. The apparatus of claim 25, wherein the controller is further configured to:
  determine the cyclic shift value applied to the DM RS sequence based on the group identity;
  determine an orthogonal code applied to the DM RS sequence; and
  generate the DM RS sequence by multiplying a reference signal (RS) sequence defined by the cyclic shift value with the orthogonal code.

27. The apparatus of claim 25, wherein, if the synchronization identity is applied for the DM RS sequence, the controller is further configured to:
  determine the cyclic shift value applied to the DM RS sequence based on the synchronization identity;
  determine an orthogonal code applied to the DM RS sequence; and
  generate the DM RS sequence by multiplying a reference signal (RS) sequence defined by the cyclic shift value with the orthogonal code.

28. The apparatus of claim 25,
wherein the controller is further configured to:
  determine a group hopping pattern of a slot; and
  determine a sequence group number of the slot regarding the DM RS sequence based on the group hopping pattern and a sequence shift pattern,
wherein a function of the group hopping pattern is determined as 0 when group hopping is disabled,
wherein the function of the group hopping pattern is determined based on a pseudo random sequence related to the slot when the group hopping is enabled,
wherein the sequence shift pattern is determined based on the group identity, and
wherein the pseudo random sequence is generated based on an initialization value defined by the group identity.

29. The apparatus of claim 25,
wherein the controller is further configured to:
  determine a group hopping pattern of a slot; and
  determine a sequence group number of the slot regarding the DM RS sequence based on the group hopping pattern and a sequence shift pattern,
wherein a function of the group hopping pattern is determined as 0 when group hopping is disabled,
wherein the function of the group hopping pattern is determined based on a pseudo random sequence related to the slot when the group hopping is enabled,
wherein the sequence shift pattern is determined based on a predetermined value, and
wherein the pseudo random sequence is generated based on an initialization value defined by the group identity.

30. The apparatus of claim 25,
wherein the controller is further configured to:
  determine a group hopping pattern of a slot; and
  determine a sequence group number of the slot regarding the DM RS sequence based on the group hopping pattern and a sequence shift pattern,
wherein a function of the group hopping pattern is determined as 0 when group hopping is disabled,
wherein the function of the group hopping pattern is determined based on a pseudo random sequence related to the slot when the group hopping is enabled,
wherein the sequence shift pattern is determined based on the synchronization identity, and
wherein the pseudo random sequence is generated based on an initialization value defined by the group identity.

31. The apparatus of claim 25,
wherein the controller is further configured to:
  determine a sequence number of the DM RS sequence as 0 when a length of the DM RS sequence is smaller than six resource blocks (RBs);
  determine the sequence number of the DM RS sequence as a pseudo random sequence when the length of the DM RS sequence is not smaller than the six RBs, when group hopping is disabled, and when sequence hopping is enabled; and
  determine the sequence number of the DM RS sequence as 0 when the length of the DM RS sequence is not smaller than the six RBs, and when the group hopping is enabled or the sequence hopping is disabled, and
wherein the pseudo random sequence is generated based on an initialization value defined by the group identity.

32. The apparatus of claim 25, wherein the receiver is further configured to receive, from a base station, information regarding at least one of the synchronization identity and the group identity.

* * * * *